(12) United States Patent
Oddy

(10) Patent No.: US 11,361,164 B2
(45) Date of Patent: Jun. 14, 2022

(54) NATURAL LANGUAGE PLATFORM FOR AUTOMATED MESSAGE PROCESSING

(71) Applicant: Bank of America Corporation, Charlotte, NC (US)

(72) Inventor: Robert Julian Oddy, London (GB)

(73) Assignee: Bank of America Corporation, Charlotte, NC (US)

( * ) Notice: Subject to any disclaimer, the term of this patent is extended or adjusted under 35 U.S.C. 154(b) by 225 days.

(21) Appl. No.: 16/789,573

(22) Filed: Feb. 13, 2020

(65) Prior Publication Data

US 2021/0256215 A1  Aug. 19, 2021

(51) Int. Cl.
  *G06F 40/30*  (2020.01)
  *G06N 20/00*  (2019.01)
  *G06F 40/205*  (2020.01)
  *H04L 51/02*  (2022.01)
  *G06F 40/263*  (2020.01)

(52) U.S. Cl.
  CPC .......... *G06F 40/30* (2020.01); *G06F 40/205* (2020.01); *G06F 40/263* (2020.01); *G06N 20/00* (2019.01); *H04L 51/02* (2013.01)

(58) Field of Classification Search
  CPC ....... G06F 40/30; G06F 40/205; G06N 20/00; H04L 51/02
  USPC .................................................... 704/9, 276
  See application file for complete search history.

(56) References Cited

U.S. PATENT DOCUMENTS

| | | | |
|---|---|---|---|
| 9,424,538 B1 | 8/2016 | Buddepalli et al. | |
| 9,559,931 B2 | 1/2017 | Hitchcock et al. | |
| 9,596,202 B1 | 3/2017 | Beach et al. | |
| 9,621,580 B2 | 4/2017 | Buddepalli et al. | |
| 10,284,806 B2 | 5/2019 | Cao et al. | |
| 10,362,458 B1 | 7/2019 | Ledet | |
| 10,388,274 B1* | 8/2019 | Hoffmeister | G06N 3/0445 |
| 10,389,673 B2 | 8/2019 | Kursun et al. | |
| 10,425,364 B2 | 9/2019 | Bastide et al. | |
| 10,511,560 B2 | 12/2019 | Kursun et al. | |
| 10,558,982 B1 | 2/2020 | Coman et al. | |
| 10,891,430 B2* | 1/2021 | Carter | G06V 30/416 |
| 11,087,739 B1* | 8/2021 | Rastrow | G06F 40/216 |
| 11,120,790 B2* | 9/2021 | Mahmood | G10L 15/30 |
| 11,132,509 B1* | 9/2021 | Pasko | G06K 9/6267 |

(Continued)

*Primary Examiner* — Akwasi M Sarpong
(74) *Attorney, Agent, or Firm* — Banner & Witcoff, Ltd.

(57) ABSTRACT

Aspects of the disclosure relate to using natural language processing techniques for automated message processing. A computing platform may receive a first message and may apply natural language processing algorithms to the first message to identify an intent associated with the first message and a confidence score associated with the identified intent. The computing platform may determine that the confidence score exceeds a predetermined intent identification threshold. In response to determining that the confidence score exceeds the predetermined intent identification threshold, the computing platform may identify a destination device associated with the intent and a corresponding structured format. The computing platform may generate a second message, which may include the intent and may conform to the structured format. The computing platform may send, to the destination device, the second message, which may cause the destination device to perform an action associated with the intent.

20 Claims, 13 Drawing Sheets

---

405

Data Entry Interface

We need a value of funds to be transferred to fulfill your request.
Please enter a value below:

Value for Transfer: ☐

(56) References Cited

U.S. PATENT DOCUMENTS

| | | |
|---|---|---|
| 2015/0365369 A1 | 12/2015 | Tokuda et al. |
| 2016/0014068 A1 | 1/2016 | Farkas |
| 2016/0277336 A1 | 9/2016 | Sachtjen et al. |
| 2016/0315897 A1 | 10/2016 | Vitaldevara et al. |
| 2016/0323296 A1 | 11/2016 | Daniell et al. |
| 2016/0380942 A1 | 12/2016 | Salpe et al. |
| 2017/0026389 A1 | 1/2017 | Gatti |
| 2017/0026411 A1 | 1/2017 | Gatti |
| 2017/0126597 A1 | 5/2017 | Hitchcock et al. |
| 2017/0142049 A1 | 5/2017 | Ganin et al. |
| 2017/0352041 A1* | 12/2017 | Ramamurthy .......... G06N 5/043 |
| 2019/0034484 A1* | 1/2019 | Das ........................ G06N 3/08 |
| 2019/0103095 A1* | 4/2019 | Singaraju ............... G06N 5/003 |
| 2019/0147029 A1* | 5/2019 | Chiu ....................... G06F 40/30 |
| | | 715/226 |
| 2019/0164064 A1* | 5/2019 | Li ........................... G06N 7/005 |
| 2019/0236130 A1* | 8/2019 | Li ........................... G10L 15/22 |
| 2019/0349213 A1* | 11/2019 | Shive ..................... G05B 15/02 |
| 2019/0361977 A1* | 11/2019 | Crudele ................. G06K 9/6256 |
| 2019/0362452 A1* | 11/2019 | Brunets ................. G06F 16/178 |
| 2020/0218995 A1* | 7/2020 | Neogi .................... G06F 16/3329 |
| 2021/0042372 A1* | 2/2021 | Huang ................... G06F 16/9538 |
| 2021/0073293 A1* | 3/2021 | Fenton ................... H04L 51/02 |

* cited by examiner

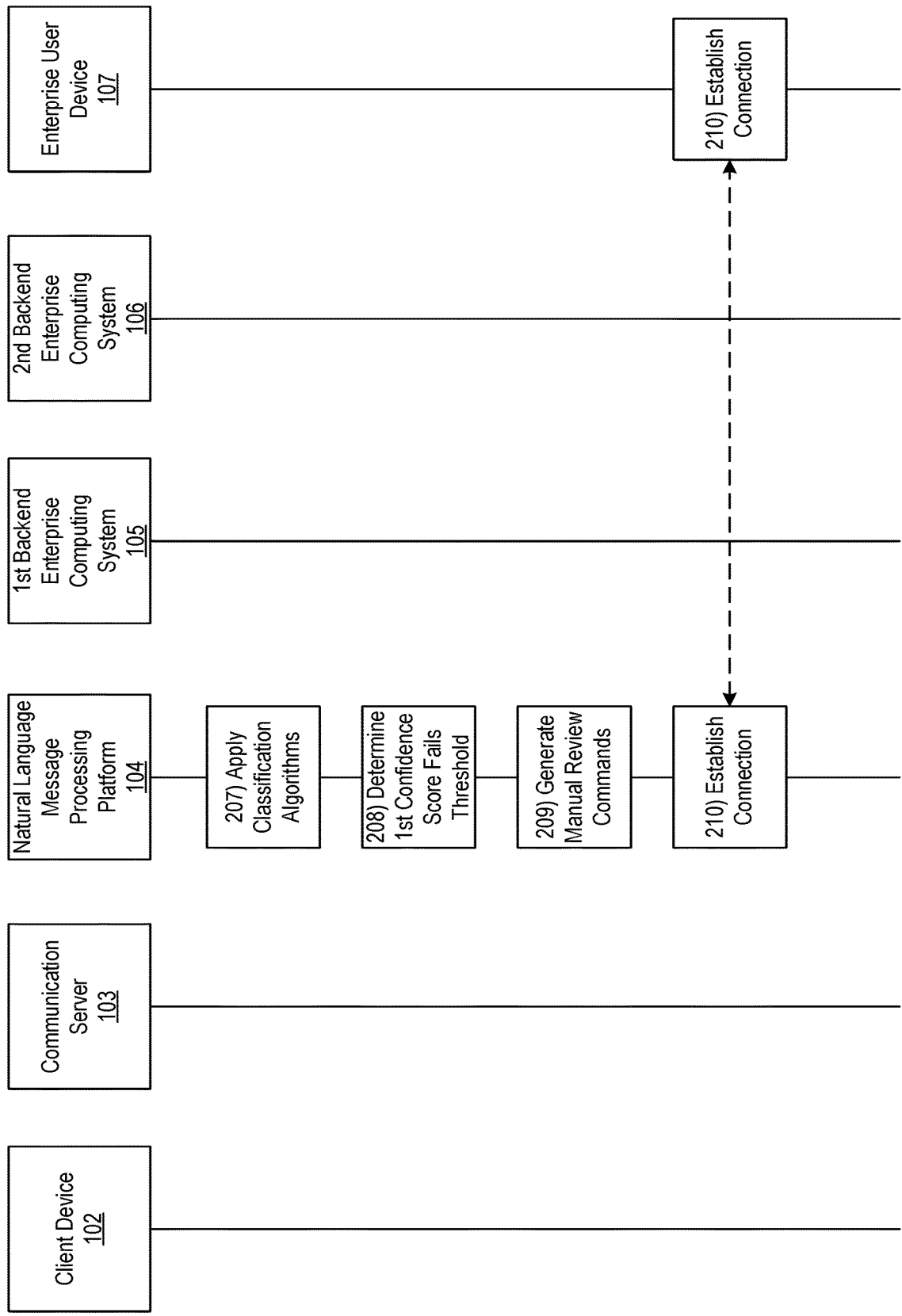

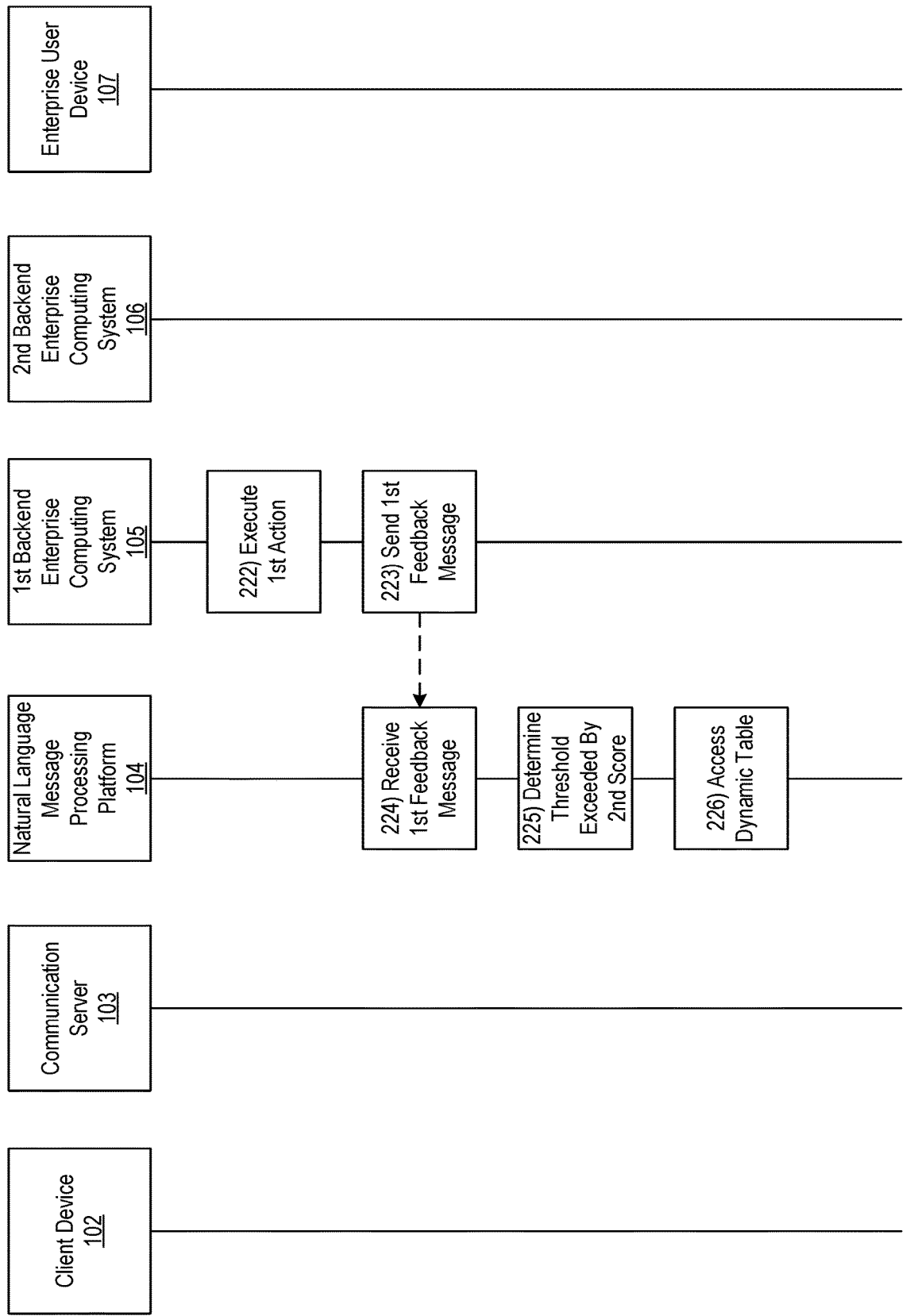

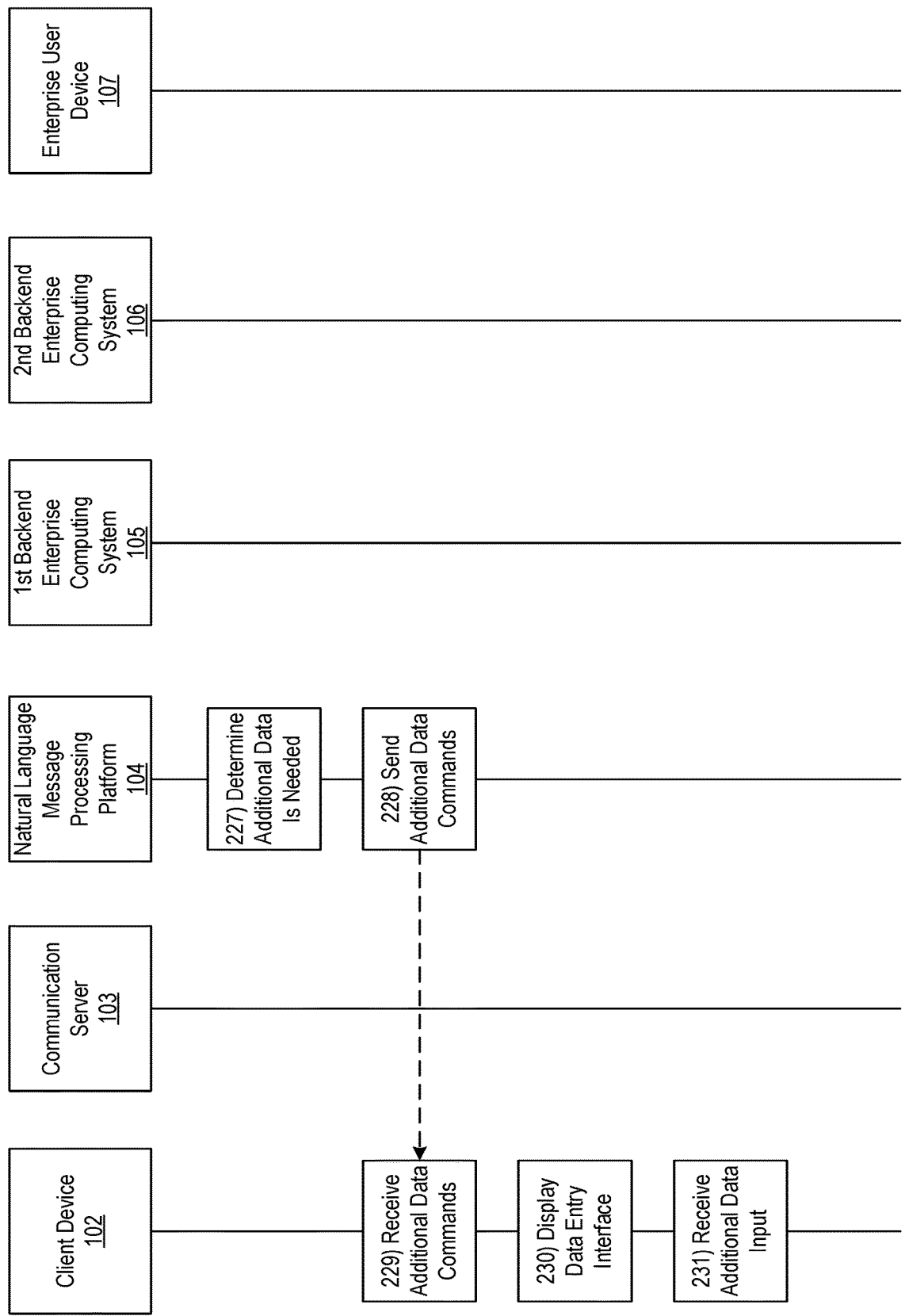

305

Manual Review Interface

Message intent identified as change of address request. Please review and confirm.

| Old Address: "Address #1" | New Address: "Address #2" |

Data Entry Interface

We need a value of funds to be transferred to fulfill your request. Please enter a value below:

Value for Transfer: ☐

Feedback Interface

Your address has been changed from
"Address #1" to "Address #2," and
funds have been transferred from
"Account #1 to Account #2."

FIG. 5

NATURAL LANGUAGE PLATFORM FOR AUTOMATED MESSAGE PROCESSING

BACKGROUND

Aspects of the disclosure relate to message processing. In particular, one or more aspects of the disclosure relate to computing platforms that implement natural language processing in message processing.

In some cases, enterprise organizations such as financial institutions may receive messages that include requests to perform various actions (e.g., change account information, process a transaction, or the like). In some instances, these messages may be directed or routed to different services for processing, and each service may be configured to process message data in a specified input format. In some instances, however, implementation of such a plurality of processing services may require that requesting individuals know in advance which service to send the messages to, and may require that messages are correctly formatted by these individuals. These deficiencies may result in sub-optimal message processing, and as a result, it may be difficult for enterprise organizations to automatically process actions requested in the messages, which may result in inefficiencies for the organizations.

SUMMARY

Aspects of the disclosure provide effective, efficient, scalable, and convenient technical solutions that address and overcome the technical problems associated with message processing. For example, some aspects of the disclosure provide techniques that may enable computing devices to automatically identify a backend enterprise computing system configured to execute requested events in the messages, identify a structured format in which each identified backend enterprise computing system is configured to process data, and identify mandatory data fields associated with each identified structured format (e.g., indicating data that must be included for processing of a requested event by the various backend enterprise computing systems). The computing systems may then repackage the content from the received messages for processing at the various backend enterprise computing systems. In doing so, various technical advantages may be realized. For example, one technical advantage of using natural language processing to identify message intents and to generate dynamic tables containing such information is that messages may be received at a single location, which may identify a destination device for the messages (e.g., backend enterprise computing systems configured to execute actions requested in the messages), repackage the message content into formats that may allow the messages to be processed at the various backend enterprise computing systems, and forward the messages accordingly. This approach may prevent users from having to forward messages to various mailboxes associated with different services (e.g., changing account information in a first location, causing a fund transfer in a second location, or the like) and/or prevent processing failures due to messages being forwarded in incorrect formats to a particular mailbox. Furthermore, another technical advantage is that message content may be evaluated, prior to routing the messages downstream for processing, to ensure that they contain all necessary information for processing (e.g., all mandatory fields are complete). This approach may conserve computing resources by identifying problems with messages upstream, prior to routing them to the backend enterprise computing systems for execution. Furthermore, a message enhancement process may allow the computing systems to request and/or access this missing information and automatically supplement the messages with the missing information prior to routing them to the backend enterprise computing systems for execution. Yet another technical advantage of one or more of the systems and methods described herein is that new scripts might not need to be programmed for newly introduced message formats (e.g., because existing systems may be able to process the messages regardless of format using machine learning and natural language processing). This may reduce inefficiencies caused by the large scale reprogramming that might be required if such a system were not applied. In one or more instances, one or more of the systems or methods described herein may use cognitive automation technology, which may include strategically employing a combination of advanced computing technologies such as natural language processing, computer vision methods, artificial intelligence, machine learning, or the like.

In accordance with one or more embodiments of the disclosure, a computing platform comprising at least one processor, a communication interface, and memory storing computer-readable instructions may receive a first message. In one or more instances, the first message may contain one or more underlying intents expressed and/or implied by an author or sender of the first message. In these instances, the computing platform may parse the first message into one or more intents, and then assess, identify, enrich and/or correct each of the identified intents prior to dispatching the first message and/or the identified intents for processing. In these instances, subsequent messages may be received and handled in a similar manner as described herein. Additionally or alternatively, the computing platform may receive the first message and subsequently may apply one or more natural language processing algorithms to the first message to identify a first intent associated with the first message and a first confidence score associated with the identified first intent. Next, the computing platform may determine that the first confidence score exceeds a predetermined intent identification threshold. In response to determining that the first confidence score exceeds the predetermined intent identification threshold, the computing platform may identify a first destination device associated with the identified intent and a structured format associated with the first destination device. In addition, the computing platform may generate a second message, which may include the identified intent and may conform to the structured format associated with the first destination device. Subsequently, the computing platform may send, to the first destination device, the second message, which may cause the first destination device to perform an action associated with the identified first intent.

In one or more instances, applying the one or more natural language processing algorithms to the first message may cause the computing platform to identify a second intent associated with the first message and a second confidence score associated with the second identified intent. In one or more instances, the computing platform may determine that the second confidence score does not exceed the predetermined intent identification threshold. In response to determining that the second confidence score does not exceed the predetermined intent identification threshold, the computing platform may send one or more commands directing an enterprise user device to display a prompt for manual review of the second identified intent.

In one or more instances, in response to the one or more commands directing the enterprise user device to display the prompt for manual review of the second identified intent, the computing platform may receive a third message indicating user input entered at the enterprise user device in response to the prompt for the manual review of the second identified intent. Based on the user input, the computing platform may tune one or more machine learning models used to determine the second intent.

In one or more instances, based on the user input entered at the enterprise user device in response to the prompt for the manual review of the second identified intent, the computing platform may identify a second destination device associated with the second identified intent and a structured format associated with the second destination device. The computing platform may generate a fourth message, which may include the second identified intent and may conform to the structured format associated with the second destination device. The computing platform may send, to the second destination device, the second message, which may cause the second destination device to perform an action associated with the second identified intent.

In one or more instances, the computing platform may receive: a first feedback message indicating the first destination device performed the action associated with the first identified intent, and a second feedback message indicating the second destination device performed the action associated with the second identified intent. Based on the first feedback message and the second feedback message, the computing platform may generate a third feedback message indicating that the action associated with the first identified intent and the action associated with the second identified intent have been completed. The computing platform may send, to a sender device associated with the first message, the third feedback message.

In one or more instances, the computing platform may identify a language of the first message, and may generate the third feedback message in the language of the first message. In one or more instances, prior to sending the second message, the computing platform may determine that the first message does not contain information needed by the first destination device to perform the action associated with the first intent. The computing platform may send, to a sender device that sent the first message, one or more commands directing the sender device to display a prompt for the information needed by the first destination device to perform the action associated with the first intent. In response to the one or more commands directing the sender device to display a prompt for the information needed by the first destination device to perform the action associated with the first intent, the computing platform may receive, from the sender device, the information needed by the first destination device to perform the action associated with the first intent.

In one or more instances, the computing platform may generate the second message using the information needed by the first destination device to perform the action associated with the first intent. In one or more instances, prior to sending the second message, the computing platform may determine that the first message does not contain information needed by the first destination device to perform the action associated with the first intent. The computing platform may identify an enterprise data source hosting the information needed by the first destination device to perform the action associated with the first intent. The computing platform may send, to the enterprise data source hosting the information needed by the first destination device to perform the action associated with the first intent, one or more commands directing the enterprise data source to provide the information needed by the first destination device to perform the action associated with the first intent. In response to the one or more commands directing the enterprise data source to provide the information needed by the first destination device to perform the action associated with the first intent, the computing platform may receive, from the enterprise data source, the information needed by the first destination device to perform the action associated with the first intent, and the computing platform may generate the second message based on the information needed by the first destination device to perform the action associated with the first intent.

In one or more instances, the computing platform may identify the first destination device associated with the identified intent and the structured format associated with the first destination device by accessing a dynamic stored table. In some instances, the dynamic stored table may contain: correlations between one or more intents and one or more destination devices, correlations between the one or more destination devices and one or more structured formats, and correlations between the one or more structured formats and one or more mandatory data fields. In these instances, the computing platform may determine that the first message does not contain the information needed by the first destination device to perform the action associated with the first intent by comparing content from the first message with one or more mandatory data fields associated with one or more structured formats associated with one or more destination devices associated with the first intent.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2H depict an illustrative event sequence for implementing natural language techniques for automated message processing in accordance with one or more example embodiments;

FIGS. 3-5 depict illustrative user interfaces for implementing natural language techniques for automated message processing in accordance with one or more example embodiments.

DETAILED DESCRIPTION

Figure 1A:
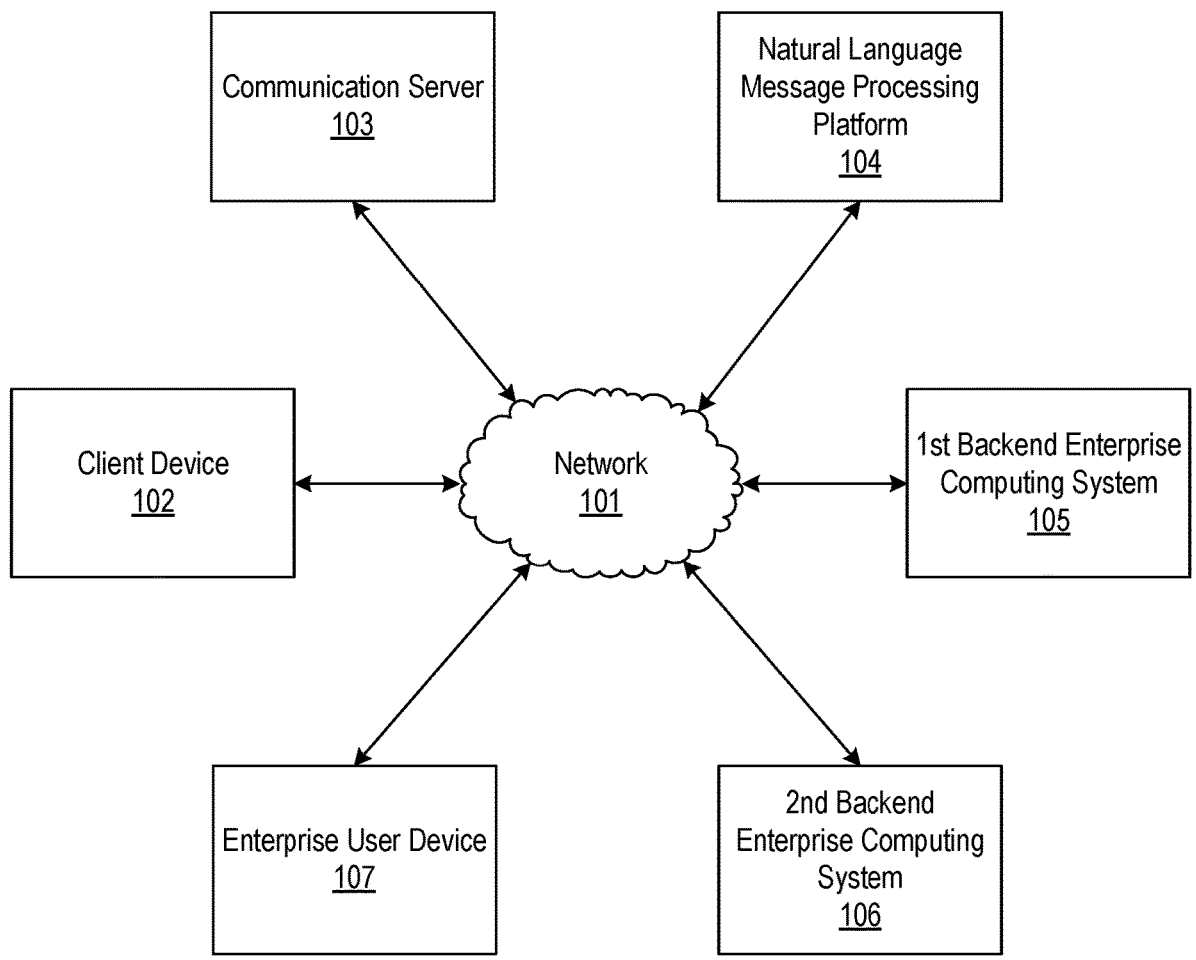
FIGS. 1A-1B depict an illustrative computing environment for implementing natural language techniques for automated message processing in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure provide systems and methods to efficiently and effectively implement natural language processing and artificial intelligence for automated message processing. For example, input files, messages, or the like may be received in a number of different formats (e.g., based on an associated sender device, content, or the like). This may require, however, that custom services are created for each of the different formats to facilitate processing of the input files. Processing of these input files may be made more efficient using a common framework that is extensible and flexible, so that input files in any format may be streamlined to the common framework for processing. Accordingly, input files associated with newly developed technologies may be handled by the common framework without a need to design a custom service.

In some instances, this common framework may group and analyze all messages (e.g., emails, text messages, multimedia messages, instant messages, or the like) into a common mailbox, and identify messages that may be processed automatically. For these identified messages, the common framework may identify an intent associated with the identified messages (e.g., what is being requested by the message). After identifying an intent for a message, the common framework may identify whether all relevant data may be extracted from the message (e.g., does the message contain all relevant data needed to perform an action associated with the intent). If more data is needed, the common framework may prompt a sender of the message for additional data. Once all necessary data is available, the common framework may process through the messages. In instances where manual review of a message should be performed, the common framework may route the message accordingly.

Accordingly, by performing the one or more methods described herein, one or more of the systems described herein may implement efficient machine learning methods for analyzing and automatically processing messages. Furthermore, by implementing the common framework architecture described above, all types of messages may be streamlined to a common service, and additional services might not need to be created to support changes or new technology as they are developed. This may result in processing efficiencies such as a reduction in processing time for messages not supported by an existing custom service. Furthermore, this may result in storage efficiencies, as separate services might not need to be stored for a plurality of message types. Rather, only the single, common framework may be stored.

Figure 1B:
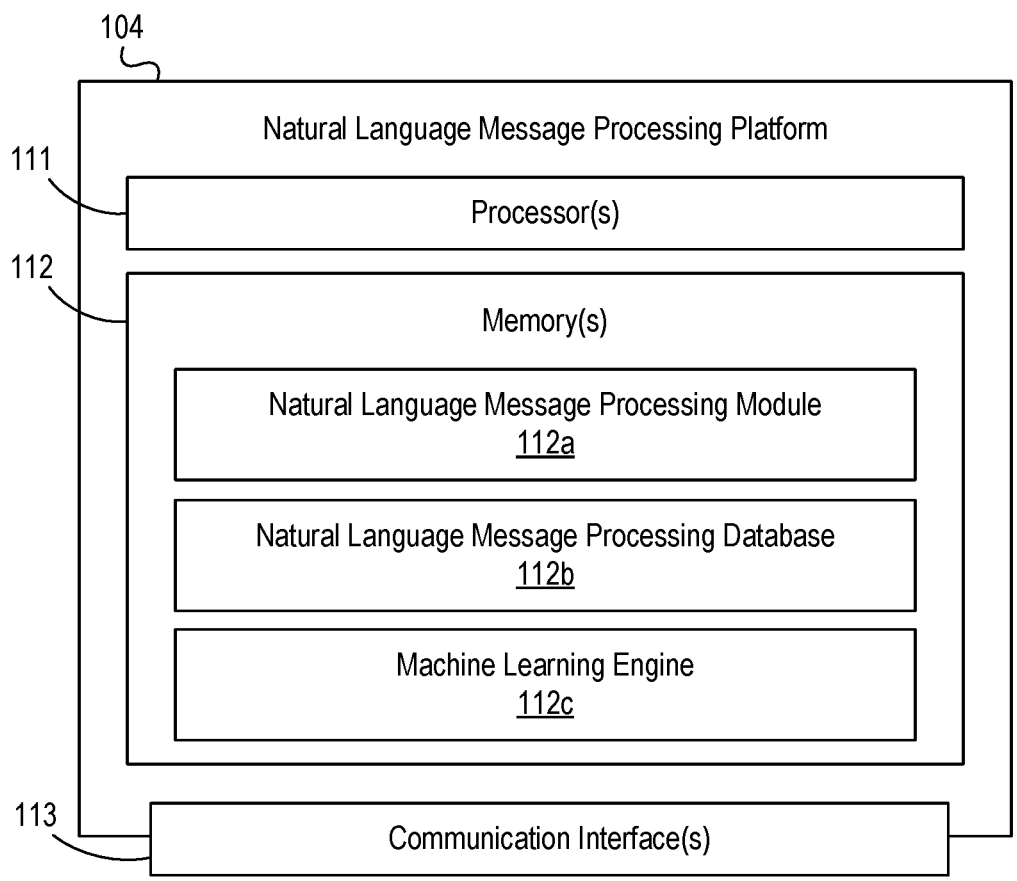

FIGS. 1A-1B depict an illustrative computing environment that implements natural language techniques for automated message processing in accordance with one or more example embodiments. Referring to FIG. 1A, computing environment 100 may include one or more computer systems. For example, computing environment 100 may include a client device 102, communication server 103, natural language message processing platform 104, first backend enterprise computing system 105, second backend enterprise computing system 106, and an enterprise user device 107.

Client device 102 may be a desktop computer, laptop computer, tablet, mobile device, or the like, and may be used by an individual such as a customer of an enterprise organization (e.g., a financial institution, or the like). For example, the client device 102 may request changes to account information, fund transfers, or the like. In addition, client device 102 may be configured to cause display of and/or otherwise present one or more graphical user interfaces (e.g., interfaces that request additional data, indicate processing of a requested event, or the like).

Communication server 103 may be a server, server blade, or the like configured to host an electronic messaging service (e.g., an email service, instant message service, text service, other method of electronic communication, or the like). In one or more instances, the communication server 103 may be configured to receive a message, extract content of the message (e.g., text, properties, or the like), and send the extracted content to a natural language message processing platform (e.g., natural language message processing platform 104).

As described further below, natural language message processing platform 104 may be a computer system that includes one or more computing devices (e.g., servers, server blades, or the like) and/or other computer components (e.g., processors, memories, communication interfaces) that may be used to implement machine learning algorithms, artificial intelligence, and/or machine learning to process messages received in a plurality of formats (e.g., document types, request types, or the like). In some instances, the natural language message processing platform 104 may be maintained by an enterprise organization (e.g., a financial institution, or the like) and may be configured to identify an intent associated with the message (e.g., change account information, process transaction, or the like), identify a backend enterprise computing system (e.g., first backend enterprise computing system 105, second backend enterprise computing system 106, or the like) configured to perform an action based on the identified intent, generate a new message that includes content of the original message in a structured format associated with the identified backend enterprise computing system, and send the new message to the identified backend enterprise computing system for processing. In some instances, the natural language message processing platform 104 may be configured to maintain a dynamic table that stores correlations between 1) intents and backend enterprise computing systems configured to perform actions associated with the intents, 2) backend enterprise computing systems and structured formats in which each of the backend enterprise computing systems is configured to process messages, and 3) structured formats and mandatory fields, included in the structured formats, associated with data that is necessary for processing of a message in each of the structured formats.

First backend enterprise computing system 105 may be a server, desktop computer, laptop computer, tablet, mobile device, or the like, that is configured to process one or more events associated with an enterprise organization (e.g., a financial institution, or the like). For example, first backend enterprise computing system 105 may be configured to generate and/or process changes to account information, transactions, or the like.

Second backend enterprise computing system 106 may be a server, desktop computer, laptop computer, tablet, mobile device, or the like, that is configured to process one or more events associated with an enterprise organization (e.g., a financial institution, or the like). For example, second backend enterprise computing system 106 may be configured to generate and/or process changes to account information, transactions, or the like. In some instances, second backend enterprise computing system 106 may be configured to process different types of events than the first backend enterprise computing system 105, and may be configured to process event processing requests in a different structured format than the first backend enterprise computing system 105.

Enterprise user device 107 may be a desktop computer, laptop computer, tablet, mobile device, or the like, and may be used by an individual such as an employee of an enterprise organization (e.g., a financial institution, or the like). For example, enterprise user device 107 may be configured to receive and process requests for manual review of identified message intents. In addition, enterprise user device 107 may be configured to cause display of and/or otherwise present one or more graphical user interfaces (e.g., interfaces that allow an employee to review an identified message intent, or the like).

Computing environment 100 also may include one or more networks, which may interconnect client device 102, communication server 103, natural language message processing platform 104, first backend enterprise computing system 105, second backend enterprise computing system 106, enterprise user device 107, or the like. For example, computing environment 100 may include a network 101 (which may interconnect, e.g., client device 102, communication server 103, natural language message processing platform 104, first backend enterprise computing system 105, second backend enterprise computing system 106, enterprise user device 107, or the like).

In one or more arrangements, client device 102, communication server 103, natural language message processing platform 104, first backend enterprise computing system 105, second backend enterprise computing system 106, and enterprise user device 107 may be any type of computing device capable of sending and/or receiving requests and processing the requests accordingly. For example, client device 102, communication server 103, natural language message processing platform 104, first backend enterprise computing system 105, second backend enterprise computing system 106, enterprise user device 107, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of client device 102, communication server 103, natural language message processing platform 104, first backend enterprise computing system 105, second backend enterprise computing system 106, and enterprise user device 107 may, in some instances, be special-purpose computing devices configured to perform specific functions.

Referring to FIG. 1B, natural language message processing platform 104 may include one or more processors 111, memory 112, and communication interface 113. A data bus may interconnect processor 111, memory 112, and communication interface 113. Communication interface 113 may be a network interface configured to support communication between natural language message processing platform 104 and one or more networks (e.g., network 101, or the like). Memory 112 may include one or more program modules having instructions that when executed by processor 111 cause natural language message processing platform 104 to perform one or more functions described herein and/or one or more databases that may store and/or otherwise maintain information which may be used by such program modules and/or processor 111. In some instances, the one or more program modules and/or databases may be stored by and/or maintained in different memory units of natural language message processing platform 104 and/or by different computing devices that may form and/or otherwise make up natural language message processing platform 104. For example, memory 112 may have, host, store, and/or include natural language message processing module 112a, natural language message processing database 112b, and a machine learning engine 112c.

Natural language message processing module 112a may have instructions that direct and/or cause natural language message processing platform 104 to execute advanced machine learning techniques related to message processing, as discussed in greater detail below. Natural language message processing database 112b may store information used by natural language message processing module 112a and/or natural language message processing platform 104 in application of natural language processing techniques related to message processing, and/or in performing other functions. Machine learning engine 112c may have instructions that direct and/or cause the natural language message processing platform 104 to set, define, and/or iteratively refine optimization rules and/or other parameters used by the natural language message processing platform 104 and/or other systems in computing environment 100.

Figure 2A:
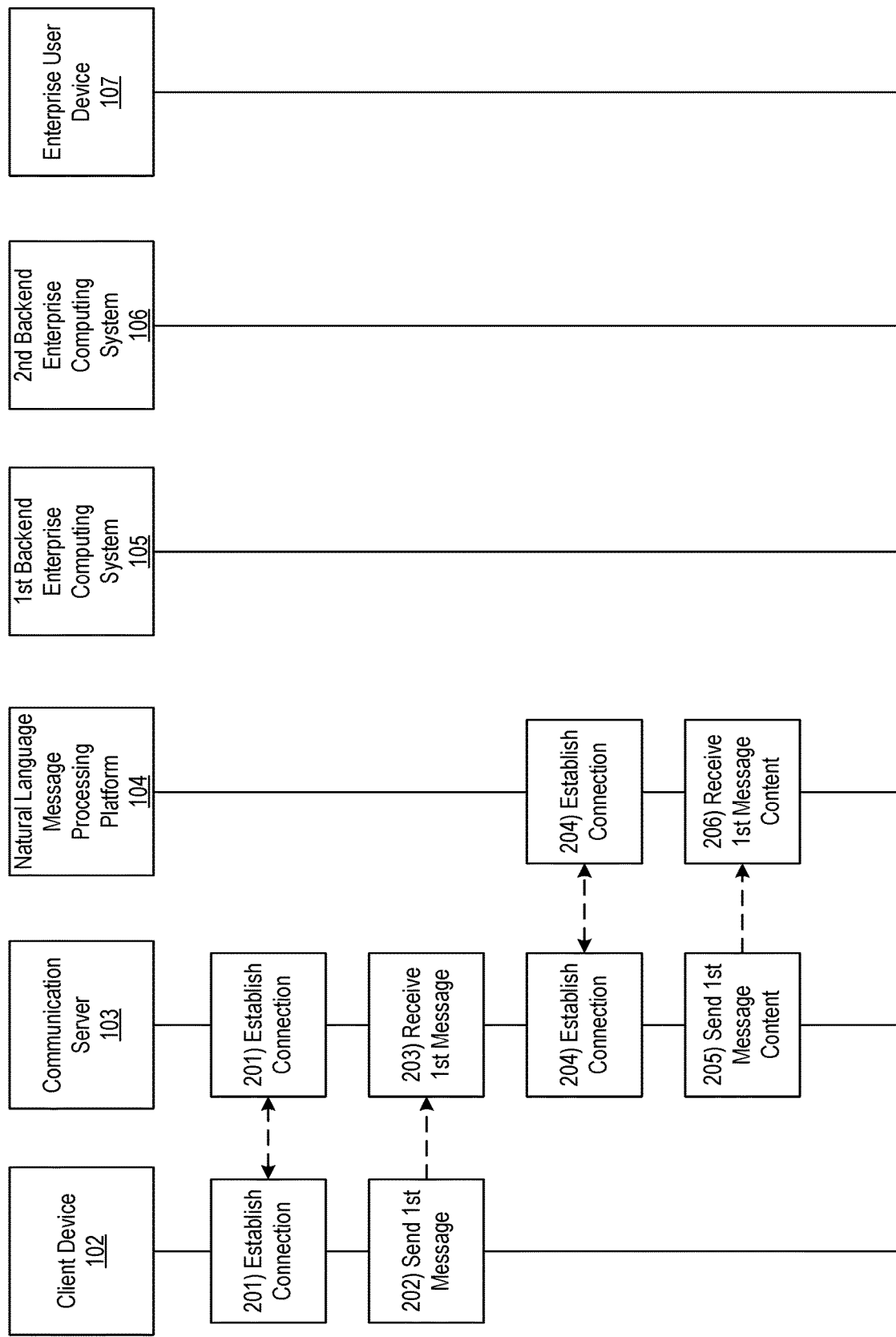

FIGS. 2A-2H depict an illustrative event sequence that implements natural language techniques for automated message processing in accordance with one or more example embodiments. Referring to FIG. 2A, at step 201, client device 102 may establish a connection with communication server 103. In one or more instances, the client device 102 may establish a first wireless data connection with communication server 103 to link the client device 102 to the communication server 103. In one or more instances, the client device 102 may identify whether or not a connection is already established with the communication server 103. If a connection is already established, the client device 102 might not reestablish the connection. If a connection is not already established, the client device 102 may establish the first wireless data connection as described herein.

At step 202, the client device 102 may send a first message to the communication server 103. In one or more instances, in sending the first message, the client device 102 may send a message configured in a natural language format (e.g., a voice message, a message from a chat application, an email, a scanned document, regulator message, or the like). In some instances, the client device 102 may send a message formatted in and/or otherwise configured in one of a plurality of different languages (e.g., English, Spanish, French, or the like). In some instances, the client device 102 may send the first message to the communication server 103 while the first wireless data connection is established. In sending the message, the client device 102 may send a message requesting that a particular action be performed (e.g., process a transaction, transfer funds, change account information, settlement instructions, equity/stock trades, loan requests, or the like). As a particular example, the client device 102 may send a message including the following language "I would like to change my home address from 'Address #1' to 'Address #2,' and would like to transfer funds from 'Account #1' to 'Account #2.'"

At step 203, the communication server 103 may receive the first message sent at step 202. In one or more instances, the communication server 103 may receive the first message while the first wireless data connection is established.

At step 204, the communication server 103 may establish a connection with natural language message processing platform 104. In one or more instances, the communication server 103 may establish a second wireless data connection with the natural language message processing platform 104 to link the communication server 103 to the natural language message processing platform 104. In some instances, the communication server 103 may identify whether or not a connection is already established with the natural language message processing platform 104. If a connection is already established with the natural language message processing platform 104, the communication server might not reestablish the connection. If a connection is not already established, the communication server 103 may establish the second wireless data connection as described herein.

At step 205, the communication server 103 may send content associated with the first message to the natural language message processing platform 104. For example, the communication server 103 may extract content (e.g., text, properties, parameters, values, or the like) associated with the first message, and may send the content to the natural language message processing platform 104. In some instances, the communication server 103 may send the extracted content to the natural language message processing platform 104 while the second wireless data connection is established. To continue with the example described above, the communication server 103 may extract content such as "Change, Address #1, Address #2, Transfer Funds, Account #1, Account #2," or the like.

At step 206, the natural language message processing platform 104 may receive the extracted content, sent at step 205. In one or more instances, the natural language message processing platform 104 may receive the extracted content via the communication interface 113 and while the second wireless data connection is established.

Referring to FIG. 2B, at step 207, the natural language message processing platform 104 may apply one or more classification algorithms to the extracted content. In one or more instances, in applying the one or more classification algorithms to the extracted content, the natural language message processing platform 104 may apply one or more natural language processing algorithms, natural language understanding algorithms, machine learning algorithms, artificial intelligence algorithms, or the like to the extracted content (e.g., text, properties, message structure, or the like) to identify one or more intents associated with the first message (e.g., the message sent at step 202). For example, the natural language message processing platform 104 may train one or more machine learning models to identify intents within the extracted content (e.g., by receiving user input corresponding to intents associated with various messages such as change of address forms, payment processing forms, or the like and storing the correlations). In one or more instances, in identifying the one or more intents associated with the first message, the natural language message processing platform 104 may identify one or more actions being requested by the first message (e.g., change account information, process a transaction, cause a fund transfer, or the like). In some instances, in identifying the one or more intents associated with the first message, the natural language message processing platform 104 may determine a confidence score associated with each identified intent (e.g., representing a degree of confidence with which each identified intent was predicted). Accordingly, in instances where multiple intents are identified by the natural language message processing platform 104, the natural language message processing platform 104 may determine multiple confidence scores associated with a single message (e.g., the first message).

As a specific example for illustrative purposes, the natural language message processing platform 104 may identify (e.g., using classification algorithms, machine learning algorithms, natural language understanding algorithms, natural language processing algorithms, artificial intelligence algorithms, or the like) that the first message is requesting that an address associated with an account be changed (e.g., a first intent) and also that a fund transfer be executed (e.g., a second intent). Accordingly, in this example, the natural language message processing platform 104 may determine a first confidence score for the first intent and a second confidence score for the second intent. For example, the natural language message processing platform 104 may determine a first confidence score of $5/10$ (e.g., representing a degree of confidence that the first message is requesting an address change) and a second confidence score of $9/10$ (e.g., representing a degree of confidence that the first message is requesting a fund transfer be executed).

In some instances, at step 207, the natural language message processing platform 104 may identify a language in which the extracted content is composed, and may store an indication of the identified language. Accordingly, the natural language message processing platform 104 may convert subsequent data received from backend enterprise computing systems (e.g., first backend enterprise computing system 105, second backend enterprise computing system 106, or the like) into the identified language (e.g., from machine code or the like) for display at the client device 102.

In some instances, the natural language message processing platform 104 may parse the first message and/or the extracted content to identify the one or more intents associated with the first message. In these instances, the natural language message processing platform 104 may assess, identify, enrich, and/or correct (e.g., manually or automatically) the one or more intents prior to displacing the first message, extracted content, one or more intents associated with the first message, or the like for further processing. In these instances, as subsequent messages are received, the natural language message processing platform 104 may process these messages in a similar manner as described herein.

At step 208, the natural language message processing platform 104 may compare the first confidence score to a predetermined intent identification threshold. In some instances, in comparing the first confidence score to the predetermined intent threshold, the natural language message processing platform 104 may determine that the first confidence score does not exceed the predetermined intent identification threshold. For example, the predetermined intent identification threshold may be a numeric value such as $7/10$, and when comparing the first confidence score (e.g., $5/10$) to the predetermined intent identification threshold (e.g., $7/10$), the natural language message processing platform 104 may determine that the first confidence score does not exceed the predetermined intent identification threshold.

In one or more instances, the natural language messaging processing platform 104 may dynamically tune the predetermined intent identification threshold to support a predetermined percentage of confidence scores that exceed/fail the predetermined intent identification threshold. For example, the natural language messaging processing platform 104 may set the predetermined intent identification threshold so as to have 50% of the confidence scores exceed the predetermined intent identification threshold and 50% of the confidence score fail the predetermined intent identification threshold. If the natural language message processing platform 104 determines that, while the predetermined intent identification threshold is set at $7/10$, 75% of confidence scores are exceeding the predetermined intent identification threshold, the natural language message processing platform 104 may increase the predetermined intent identification threshold so as to achieve the target percentages described above (e.g., increase the predetermined intent identification threshold to 9/10, or the like).

At step 209, the natural language message processing platform 104 may generate one or more commands directing enterprise user device 107 to prompt for manual review of the first identified intent. In one or more instances, the natural language message processing platform 104 may generate a manual review interface itself. In other instances, the natural language message processing platform 104 may generate manual review interface information that may be used by the enterprise user device 107 to generate the manual review interface.

At step 210, the natural language message processing platform 104 may establish a connection with the enterprise user device 107. In one or more instances, the natural language message processing platform 104 may establish a third wireless data connection with the enterprise user device 107 to link the natural language message processing platform 104 to the enterprise user device 107. In some instances, the natural language message processing platform 104 may identify whether or not a connection is already established with the enterprise user device 107. If a connection is already established, the natural language message processing platform 104 might not reestablish the connection with the enterprise user device 107. If a connection is not already established, the natural language message processing platform 104 may establish the third wireless data connection as described herein.

Figure 2C:
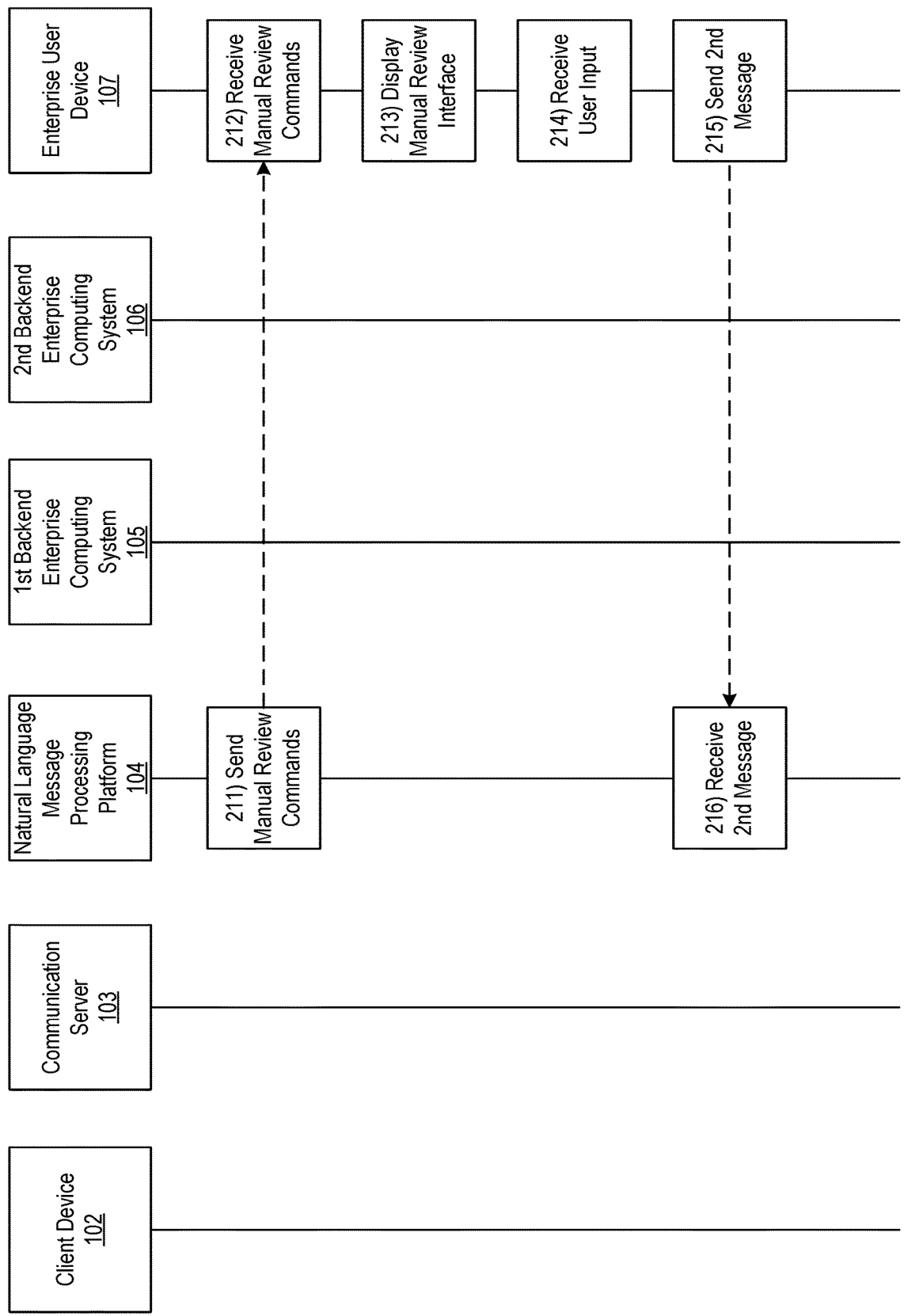

Referring to FIG. 2C, at step 211, the natural language message processing platform 104 may send the one or more commands, generated at step 209, directing the enterprise user device 107 to prompt for manual review of the first identified intent. In some instances, the natural language message processing platform 104 may send, along with the one or more commands directing the enterprise user device 107 to prompt for manual review of the first identified intent, an indication of the first identified intent and the extracted content, received at step 206. For example, the natural language message processing platform 104 may send "Change, Address #1, Address #2, Transfer Funds, Account #1, Account #2" (e.g., the extracted content) and "Change Address #1 to Address #2" (e.g., the first identified intent) along with the one or more commands directing the enterprise user device 107 to prompt for manual review of the first identified intent. In some instances, the natural language message processing platform 104 may generate the manual review interface itself and may send the manual review interface to the enterprise user device 107 for display. In some instances, the natural language message processing platform 104 may send the one or more commands directing the enterprise user device 107 to prompt for manual review of the first identified intent via the communication interface 113 and while the third wireless data connection is established.

At step 212, the enterprise user device 107 may receive the one or more commands directing the enterprise user device 107 to prompt for manual review of the first identified intent. In some instances, the enterprise user device 107 may receive, along with the one or more commands directing the enterprise user device 107 to prompt for manual review of the first identified intent, the extracted content and an indication of the first identified intent. In some instances, the enterprise user device 107 may receive the manual review interface itself. In other instances, the enterprise user device 107 may receive manual review interface information that may be used to generate the manual review interface. In some instances, the enterprise user device 107 may receive the one or more commands directing the enterprise user device 107 to prompt for manual review of the first identified intent while the third wireless data connection is established.

At step 213, the enterprise user device 107 may generate and display a manual review interface. For example, the enterprise user device 107 may generate the manual review interface using the first identified intent and the extracted content. In some instances, the enterprise user device 107 may generate the manual review interface in response to the one or more commands directing the enterprise user device 107 to prompt for manual review of the first identified intent. In some instances, the enterprise user device 107 may receive the manual review interface from the natural language message processing platform 104 and may display the received manual review interface. In one or more instances, in displaying the manual review interface, the enterprise user device 107 may display a graphical user interface similar to graphical user interface 305. For example, the enterprise user device 107 may display the first identified intent (e.g., change address request) and the extracted content (e.g., Address #1 and Address #2).

In one or more instances, the enterprise user device 107 may identify that one or more fields, being displayed on the manual review interface, are incomplete (e.g., the information intended to be in those fields in not present on the manual review interface). In some of these instances, the enterprise user device 107 may generate and send a request to the client device 102 (e.g., a request for information in the incomplete fields). Additionally or alternatively, the enterprise user device 107 may generate and send a request to one or more other data sources for the information in the incomplete fields. In some instances, the information may be received at the enterprise user device 107 and used to enhance the manual review interface. In some instances, the enterprise user device 107 may identify that one or more fields, being displayed on the manual review interface, are incomplete, but may determine that data corresponding to these one or more fields is not necessary for processing of an action associated with the identified first intent (e.g., the one or more fields are optional). In these instances, the enterprise user device 107 might not request the information for the incomplete fields. Additionally or alternatively, even if all fields on the manual review interface are complete, in some instances, the enterprise user device 107 may request additional information from the client device 102, additional data source, or the like, and may use the additional information to verify the information displayed at the manual review interface.

At step 214, the enterprise user device 107 may receive user input at the manual review interface. In one or more instances, in receiving the user input, the enterprise user device 107 may receive user input (e.g., from an employee of an enterprise organization) indicating whether or not the identified first intent is confirmed (e.g., based on manual review of the extracted content and the identified first intent). In some instances, if the enterprise user device 107 receives user input indicating that the identified first intent is not confirmed, the enterprise user device 107 may receive user input indicating an alternative intent, identified through manual review of the extracted content and the identified first intent. In some instances, the enterprise user device 107 may also receive user input indicating a backend enterprise computing system (e.g., first backend enterprise computing system 105, second backend enterprise computing system 106, or the like) configured to perform an action associated with the identified first intent and/or the alternative intent.

For example, in receiving the user input at the graphical user interface 305, the enterprise user device 107 may receive user input indicating that the first identified intent (e.g., change Address #1 to Address #2) is confirmed, and that the first backend enterprise computing system 105 is configured to perform the address change.

At step 215, the enterprise user device 107 may generate and send a second message to the natural language message processing platform 104. In one or more instances, in sending the second message indicating the user input, the enterprise user device 107 may generate a message indicating the user input received at step 214 (e.g., whether or not the first identified intent is confirmed, a corresponding backend enterprise computing system, or the like). In some instances, the enterprise user device 107 may send the second message to the natural language message processing platform 104 while the third wireless data connection is established. For example, the enterprise user device 107 may send a message to the natural language message processing platform 104 confirming that Address #1 should be changed to Address #2, and may specify that the first backend enterprise computing system 105 is configured to perform the change of address.

At step 216, the natural language message processing platform 104 may receive the second message, sent at step 215. For example, the natural language message processing platform 104 may receive a confirmation of the first identified intent, an indication of an alternative intent, a corresponding backend enterprise computing system, or the like. In one or more instances, the natural language message processing platform 104 may receive the second message via the communication interface 113 and while the third wireless data connection is established. In one or more instances, the natural language message processing platform 104 may receive the second message in response to the one or more commands directing the enterprise user device 107 to prompt for manual review of the first identified intent.

Figure 2D:
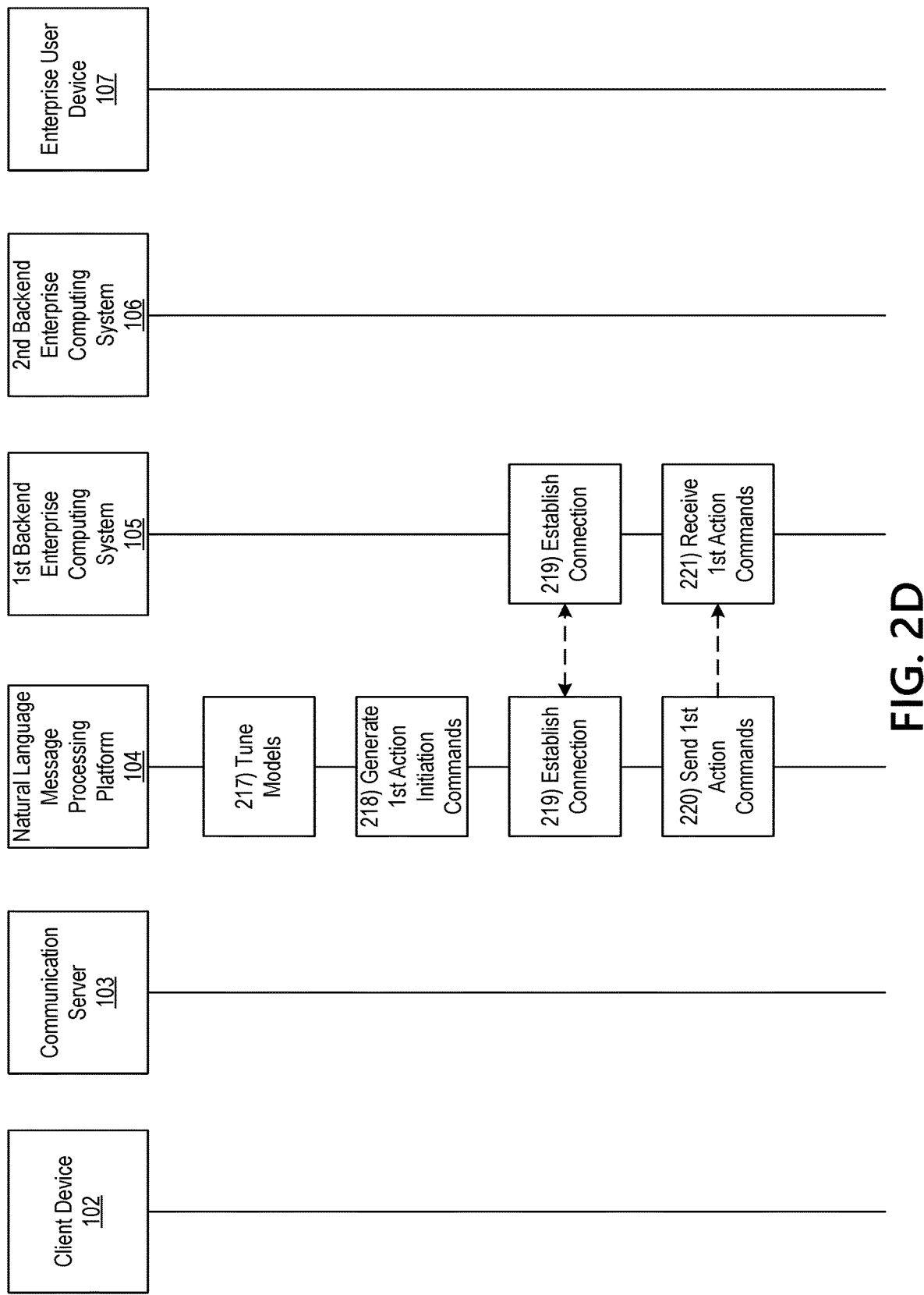

Referring to FIG. 2D, at step 217, the natural language message processing platform 104 may tune one or more machine learning models used to identify the identified first intent at step 207. For example, the natural language message processing platform 104 may modify the one or more machine learning models based on whether or not the first intent was correctly identified. If the natural language message processing platform 104 did correctly identify the first intent, the natural language message processing platform 104 may reinforce the one or more machine learning models used to identify the first intent. If the natural language message processing platform 104 did not correctly identify the first intent, the natural language message processing platform 104 may modify the one or more machine learning models based on the correct first intent (e.g., as identified based on the user input received at the manual review interface).

In one or more instances, the natural language message processing platform 104 may identify that an intent identified above was incorrect, and that such an intent and/or format of the first message might not have previously been processed at the natural language message processing platform 104. Accordingly, the natural language message processing platform 104 may determine that a software development team should be notified and that a new model should be built associated with the intent or format. In these instances, the natural language message processing platform 104 may communicate with one or more enterprise user devices associated with the software development team, and may cause the one or more enterprise user devices to display one or more notifications, alerts, interfaces, or the like.

At step 218, the natural language message processing platform 104 may generate one or more commands directing first backend enterprise computing system 105 to perform a first action based on the identified first intent. For example, the natural language message processing platform 104 may generate one or more commands directing first backend enterprise computing system 105 to change Address #1 to Address #2.

At step 219, the natural language message processing platform 104 may establish a connection with first backend enterprise computing system 105. In one or more instances, the natural language message processing platform 104 may establish a fourth wireless data connection with the first backend enterprise computing system 105 to link the natural language message processing platform 104 to the first backend enterprise computing system 105. In some instances, the natural language message processing platform 104 may identify whether or not a connection is already established with the first backend enterprise computing system 105. If a connection is already established, the natural language message processing platform 104 might not reestablish the connection with the first backend enterprise computing system 105. If a connection is not already established, the natural language message processing platform 104 may establish the fourth wireless data connection as described herein.

At step 220, the natural language message processing platform 104 may send the one or more commands, generated at step 218, directing first backend enterprise computing system 105 to perform a first action based on the identified first intent. In one or more instances, the natural language message processing platform 104 may send the one or more commands directing first backend enterprise computing system 105 to perform a first action based on the identified first intent while the fourth wireless data connection is established and via the communication interface 113. As an example, the natural language message processing platform 104 may send one or more commands directing the first backend enterprise computing system 105 to the first backend enterprise computing system 105 to change "Address #1" to "Address #2."

At step 221, the first backend enterprise computing system 105 may receive the one or more commands, sent at step 220, directing first backend enterprise computing system 105 to perform a first action based on the identified first intent. In one or more instances, the first backend enterprise computing system 105 may receive the one or more commands directing first backend enterprise computing system 105 to perform a first action based on the identified first intent while the fourth wireless data connection is established.

Referring to FIG. 2E, at step 222, the first backend enterprise computing system 105 may execute the first action in response to receiving the one or more commands directing first backend enterprise computing system 105 to perform a first action based on the identified first intent, received at step 221. For example, the first backend enterprise computing system 105 may modify one or more account records stored at the first backend enterprise computing system 105 to change a stored address of a user of the client device 102 from "Address #1" to "Address #2."

At step 223, the first backend enterprise computing system 105 may generate and send a first feedback message to the natural language message processing platform 104. For example, the first backend enterprise computing system 105 may generate and send a message indicating that the first action has been successfully executed, initiated, cannot be completed, or the like. In some instances, the first backend enterprise computing system 105 may send the first feedback message to the natural language message processing platform 104 while the fourth wireless data connection is established. For example, the first backend enterprise computing system 105 may send a message to the natural language message processing platform 104 indicating that "Address #1" has been changed to "Address #2."

At step 224, the natural language message processing platform 104 may receive the first feedback message, sent at step 223. In some instances, the natural language message processing platform 104 may receive the first feedback message via the communication interface 113 while the fourth wireless data connection is established. In some instances, in receiving the first feedback message, the natural language message processing platform 104 may receive machine code, or some other text format that is not comprehensible by a lay user of the client device 102. Accordingly, the natural language message processing platform 104 may convert the first feedback message into the language identified by the natural language message processing platform 104 at step 207 (e.g., the language of the first message).

At step 225, the natural language message processing platform 104 may determine that the second confidence score, determined at step 207, does exceed the predetermined intent identification threshold. For example, at step 207, the natural language message processing platform 104 may have determined a second confidence score of 9/10 for the identified second intent. In this example, the natural language message processing platform 104 may compare the second confidence score (e.g., 9/10) to the predetermined intent identification threshold (e.g., 7/10), and may determine that the second confidence score exceeds the predetermined intent identification threshold accordingly.

At step 226, the natural language message processing platform 104 may access a stored dynamic table (e.g., based on the determination that the second confidence score exceeds the predetermined intent identification threshold) that contains correlation information between one or more of: 1) intents (e.g., the identified first intent, the identified second intent, or the like) and destination devices (e.g., first backend enterprise computing system 105, second backend enterprise computing system 106, or the like), 2) destination devices and structured formats (e.g., formats in which data should be input to the various destination devices for processing (e.g., a particular file type, layout, or the like), and 3) the structured formats and mandatory/optional fields (e.g., data fields of the structured formats for which data must be provided for an action to be processed at the associated destination device (e.g., for a fund transfer to be complete, a value of the funds to be transferred must be specified, thus "value" may be a mandatory field in the structured format associated with a destination device configured to perform a transfer of funds, or the like). Accordingly, by accessing the stored dynamic table, the natural language message processing platform 104 may identify a destination device associated with the identified second intent (e.g., the second backend enterprise computing system 106), a structured format associated with the second backend enterprise computing system 106, and mandatory fields of the structured format. For example, the natural language message processing platform 104 may use the stored dynamic table to determine 1) that the second backend enterprise computing system 106 may be configured to perform a change of address action, 2) that the second backend enterprise computing system 106 is configured to process text files that list a value on a first line, a recipient account number and a recipient routing number on a second, a transferor account number and routing number on a third line, and a message on a fourth line), and 3) that the message field is optional, but that the value, account numbers, and routing numbers are mandatory fields.

Referring to FIG. 2F, at step 227, the natural language message processing platform 104 may determine, based on the one or more mandatory fields identified at step 226, that the extracted content does not include data corresponding to all of the one or more mandatory fields. For example, the natural language message processing platform 104 may determine that the extracted content does not include a value of the funds to be transferred.

At step 228, in response to identifying that the extracted content does not include data corresponding to all mandatory fields, the natural language message processing platform 104 may generate and send one or more commands directing client device 102 to display a prompt for additional information corresponding to the one or more mandatory fields. In some instances, the natural language message processing platform 104 may generate a data entry interface (which is described further below at step 230), and may send the data entry interface to the client device 102. In other instances, the natural language message processing platform 104 may generate and send data entry interface information, which may be used by the client device 102 to generate the data entry interface.

In one or more instances, the natural language message processing platform 104 may establish a connection with the client device 102. For example, the natural language message processing platform 104 may establish a fifth wireless data connection with the client device 102 to link the natural language message processing platform 104 to the client device 102. In some instances, the natural language message processing platform 104 may determine whether or not a connection is already established with the client device 102. If a connection is already established, the natural language message processing platform 104 might not re-establish the connection. If a connection is not already established, the natural language message processing platform 104 may establish the fifth wireless data connection as described herein.

In some instances, the natural language message processing platform 104 may send the one or more commands directing client device 102 to display a prompt for additional information corresponding to the one or more mandatory fields via the communication interface and while the fifth wireless data connection is established. For example, the natural language message processing platform 104 may send one or more commands directing the client device 102 to prompt a user for a value of the funds that should be transferred.

Additionally or alternatively, the natural language message processing platform 104 may access a client database and/or other enterprise data sources configured to host the additional information, and may automatically obtain the additional information from these other sources. In doing so, the natural language message processing platform 104 may perform a data enrichment process to supplement the extracted content and cause executions of intended actions without requesting additional input from a user. For example, in performing the data enrichment process, the natural language message processing platform 104 may access an account database and may identify an account number associated with the user of the client device. In this example, the natural language message processing platform 104 may enrich the extracted content to include the identified account number.

At step 229, the client device 102 may receive the one or more commands directing client device 102 to display a prompt for additional information corresponding to the one or more mandatory fields. In some instances, the client device 102 may receive a data entry interface. In other instances, the client device 102 may receive data entry interface information that may be used to generate the data entry interface. In some instances, the client device 102 may receive the one or more commands directing client device 102 to display a prompt for additional information corresponding to the one or more mandatory fields while the fifth wireless data connection is established.

At step 230, in response to the one or more commands directing client device 102 to display the prompt for additional information corresponding to the one or more mandatory fields, the client device 102 may generate and display a data entry interface. For example, in displaying the data entry interface, the client device 102 may display a graphical user interface similar to graphical user interface 405, which is shown in FIG. 4. For example, the client device 102 may prompt a user to provide the data missing from the mandatory fields (e.g., the value of the funds that should be transferred).

At step 231, the client device 102 may receive additional data via the data entry interface. For example, the client device 102 may receive additional data corresponding to the incomplete mandatory data (e.g., the client device 102 may receive the value of funds to be transferred, or the like).

Figure 2G:
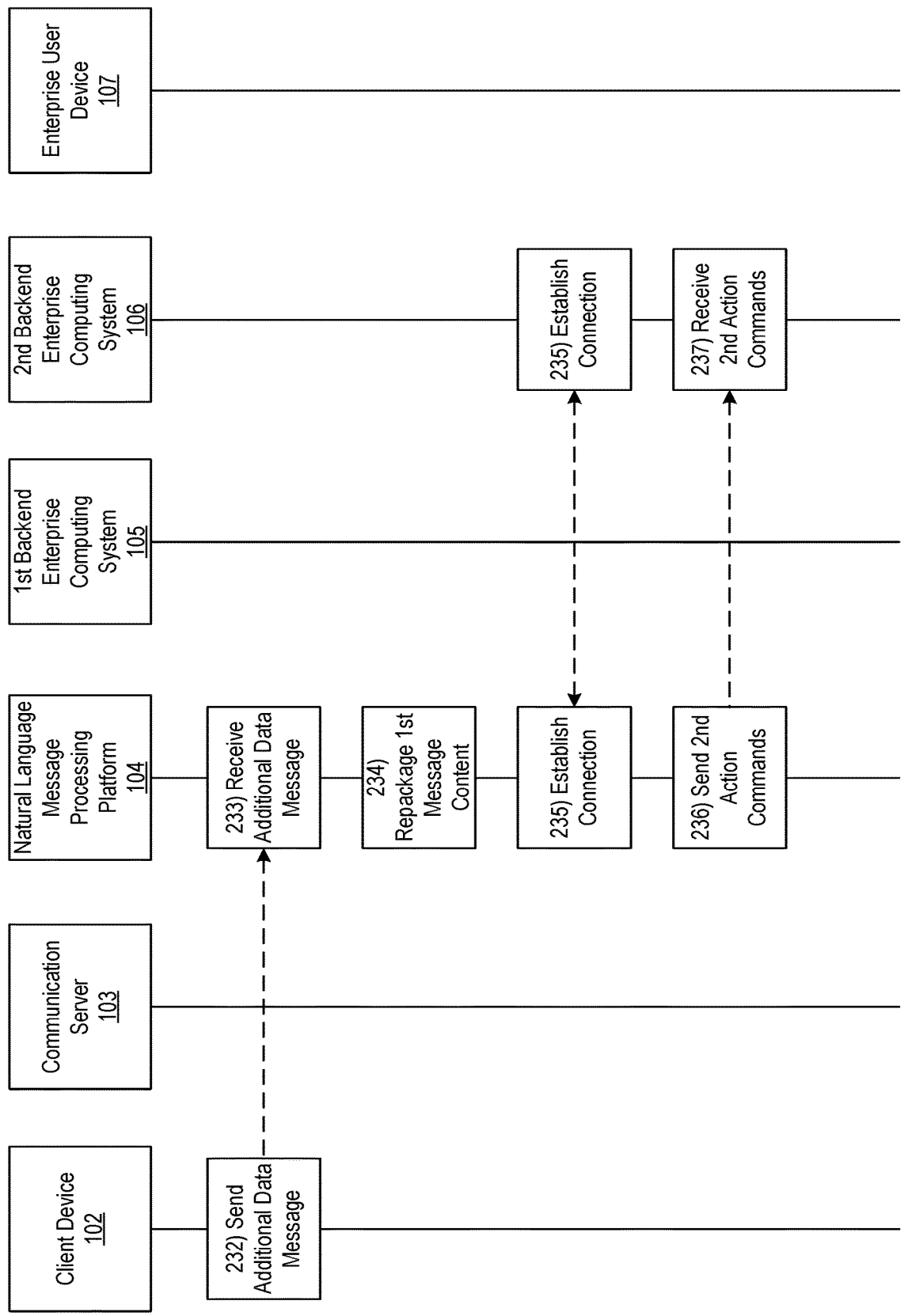

Referring to FIG. 2G, at step 232, the client device 102 may generate and send an additional data message that includes the additional data received at step 231. For example, the client device may generate and send an additional data message including the account number from which the funds should be transferred. In one or more instances, the client device 102 may send the additional data message while the fifth wireless data connection is established.

At step 233, the natural language message processing platform 104 may receive the additional data message sent at step 232. In some instances, the natural language message processing platform 104 may receive the additional data message via the communication interface 113 and while the fifth wireless data connection is established. In one or more instances, the natural language message processing platform 104 may receive the additional data message in response to the one or more commands directing client device 102 to display the prompt for additional information corresponding to the one or more mandatory fields.

At step 234, the natural language message processing platform 104 may repackage the extracted content from the first message to conform to the structured format identified at step 226 (e.g., the structured format associated with the second backend enterprise computing system 106). Additionally, the natural language message processing platform 104 may repackage the extracted content from the first message to include the additional data received at step 233. For example, the natural language message processing platform 104 may repackage the extracted content from the first message in a text file format that lists a value on a first line (e.g., from the additional data message), an recipient account number and a recipient routing number on a second, a transferor account number and routing number on a third line, and a message on a fourth line.

At step 235, the natural language message processing platform 104 may establish a connection with the second backend enterprise computing system 106. For example, the natural language message processing platform 104 may establish a sixth wireless data connection with the second backend enterprise computing system 106 to link the natural language message processing platform 104 with the second backend enterprise computing system 106. In some instances, the natural language message processing platform 104 may identify whether or not a connection is already established with the second backend enterprise computing system 106. If a connection is already established with the second backend enterprise computing system 106, the natural language message processing platform 104 might not re-establish the connection. If a connection is not already established with the second backend enterprise computing system 106, the natural language message processing platform 104 may establish the sixth wireless data connection as described herein.

At step 236, the natural language message processing platform 104 may generate and send one or more commands directing the second backend enterprise computing system 106 to perform the second action. In some instances, along with the one or more commands directing the second backend enterprise computing system 106 to perform the second identified action, the natural language message processing platform 104 may send the repackaged extracted content. In some instances, the natural language message processing platform 104 may send the one or more commands directing the second backend enterprise computing system 106 to perform the identified second action via the communication interface 113 and while the sixth wireless data connection is established. For example, the natural language message processing platform 104 may send one or more commands directing second backend enterprise computing system 106 to execute a fund transfer as specified in the first message.

At step 237, the second backend enterprise computing system 106 may receive the one or more commands directing the second backend enterprise computing system 106 to perform the second action. In some instances, the second backend enterprise computing system 106 may also receive the repackaged extracted content. In some instances, the second backend enterprise computing system 106 may receive the one or more commands directing the second backend enterprise computing system 106 to perform the second action while the sixth wireless data connection is established.

Figure 2H:
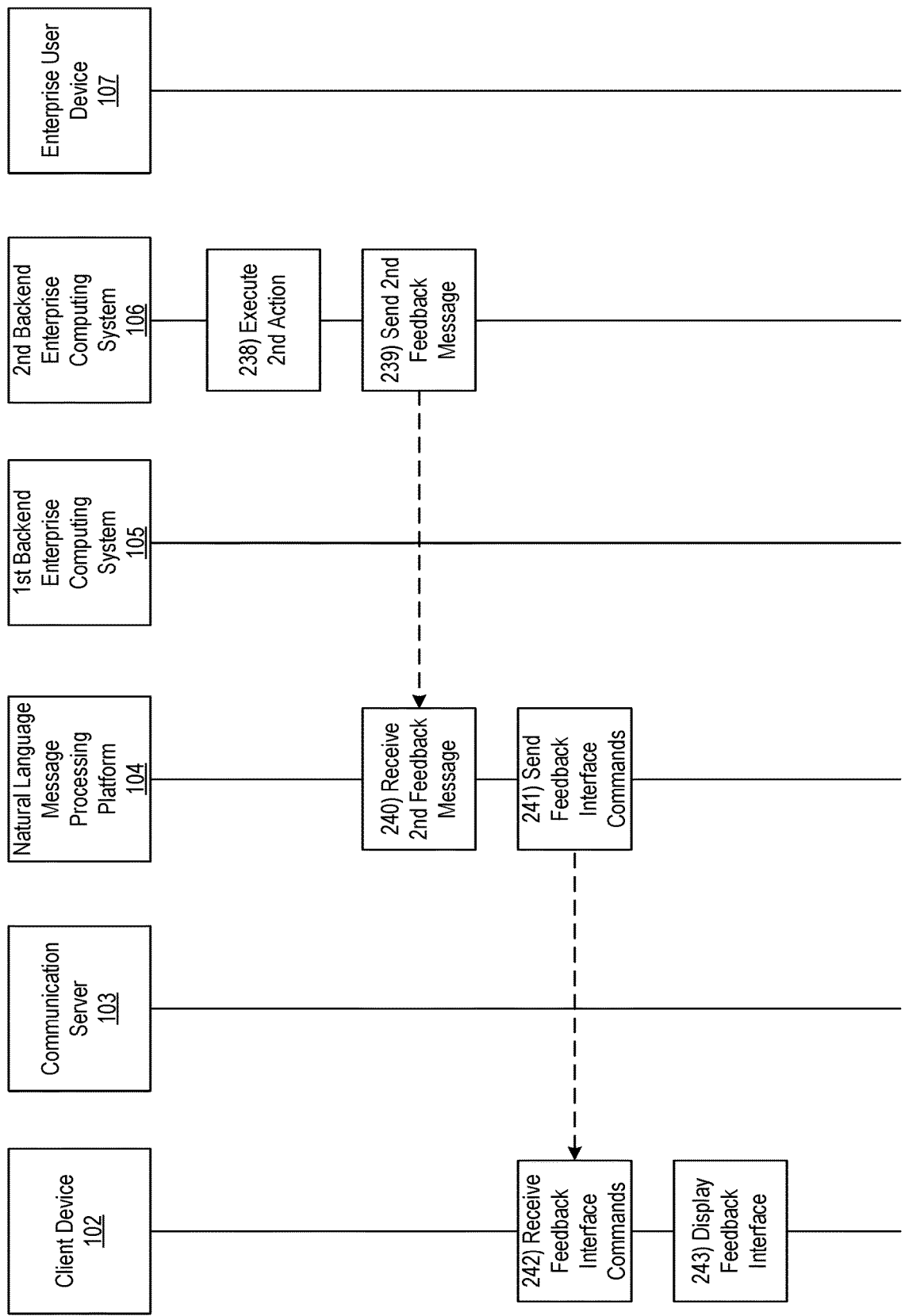

Referring to FIG. 2H, at step 238, the second backend enterprise computing system 106 may execute the second action in response to receiving the one or more commands directing the second backend enterprise computing system 106 to perform the second action. For example, the second backend enterprise computing system 106 may execute the specified fund transfer from "Account #1" to "Account #2."

At step 239, the second backend enterprise computing system 106 may generate and send a second feedback message, indicating that the second action has been successfully complete, initiated, not completed, or the like. For example, the second backend enterprise computing system 106 may generate a second feedback message indicating that the specified funds have been transferred from "Account #1" to "Account #2." In one or more instances, the second backend enterprise computing system 106 may send the second feedback message to the natural language message processing platform 104 while the sixth wireless data connection is established.

At step 240, the natural language message processing platform 104 may receive the second feedback message sent at step 239. In some instances, the natural language message processing platform 104 may receive the second feedback message via the communication interface 113 and while the sixth wireless data connection is established. In some instances, in receiving the second feedback message, the natural language message processing platform 104 may receive machine code, or some other text format that is not comprehensible by a lay user of the client device. Accordingly, the natural language message processing platform 104 may convert the first feedback message into the language identified by the natural language message processing platform 104 at step 207 (e.g., the language of the first message).

At step 241, the natural language message processing platform 104 may generate one or more commands directing the client device 102 to display a feedback interface. In some instances, the natural language message processing platform 104 may generate and send the feedback interface. In other instances, the natural language message processing platform 104 may generate and send feedback interface information that may be used by the client device 102 to generate the feedback interface. In some instances, the natural language message processing platform 104 may assemble information from both the first feedback message and the second feedback message to generate the feedback interface. In some instances, the natural language message processing platform 104 may send the one or more commands directing the client device 102 to display the feedback interface via the communication interface 113 and while the fifth wireless data connection is established.

In some instances, the natural language message processing platform 104 may have previously converted the feedback messages from the various backend enterprise computing systems from machine content into an identified language associated with the first message. Accordingly, in sending the feedback interface or feedback interface information, the natural language message processing platform 104 may send a message to the client device 102 written in the identified language of the first message.

At step 242, the client device 102 may receive the one or more commands directing client device 102 to display the feedback interface. In some instances, the client device 102 may receive the feedback interface. In other instances, the client device 102 may receive feedback interface information that may be used to generate the feedback interface. In some instances, the client device 102 may receive the one or more commands directing client device 102 to display the feedback interface while the fifth wireless data connection is established.

At step 243, the client device 102 may display the feedback interface, which may indicate a status of the actions associated with the intents identified in the first message (e.g., the identified first intent and the identified second intent). In some instances, in displaying the feedback interface, the client device 102 may display a graphical user interface similar to graphical user interface similar to graphical user interface 505, which is shown in FIG. 5. For example, the client device 102 may display an indication that "Address #1" has been changed to "Address #2" and that funds have been transferred from "Account #1" to "Account #2," both of which were requested in the first message.

Figure 6:
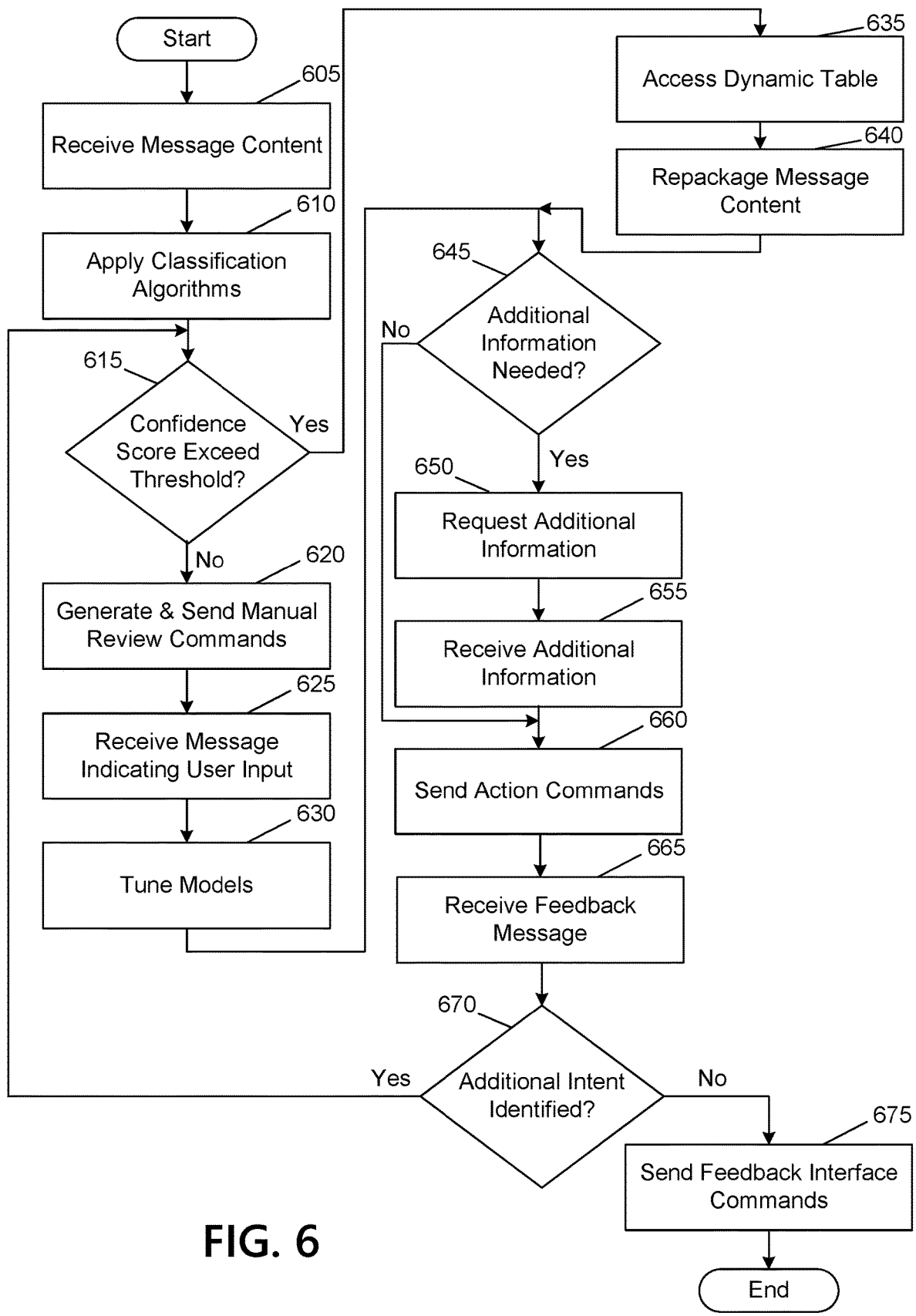
FIG. 6 depicts an illustrative method for implementing natural language techniques for automated message processing in accordance with one or more example embodiments.

FIG. 6 depicts an illustrative method implemented by an automated model generation platform for implementing natural language techniques for automated message processing in accordance with one or more example embodiments.

Referring to FIG. 6, at step 605, a computing platform having at least one processor, a communication interface, and memory may receive message content. At step 610, the computing platform may apply one or more classification algorithms to identify one or more intents associated with the message content and a confidence score for each identified intent. At step 615, the computing platform may determine whether or not a confidence score exceeds a predetermined intent identification threshold. If the confidence score does exceed the predetermined intent identification threshold, the computing platform may proceed to step 635. If the confidence score does not exceed the predetermined intent identification threshold, the computing platform may proceed to step 620.

At step 620, the computing platform may generate and send one or more commands directing a client device to display a manual review interface. At step 625, the computing platform may receive a message indicating user input received in response to the manual review interface. At step 630, the computing platform may tune one or more machine learning models used to identify the intents based on the user input.

At step 635, the computing platform may access a dynamic table to identify correspondence between intents, destination devices, structured formats, and/or mandatory data fields. At step 640, the computing platform may repackage the message content based on the intents, destination devices, structured formats, and/or mandatory data fields.

At step 645, the computing platform may determine whether any additional information is needed, based on the mandatory data fields. If additional information is needed, the computing platform may proceed to step 650. If additional information is not needed, the computing platform may proceed to step 660.

At step 650, the computing platform may request the additional information from the client device and/or another enterprise data source. At step 655, the computing platform may receive the additional information. At step 660, the computing platform may generate and send one or more commands directing a backend enterprise computing system to execute an action associated with the identified intent. At step 665, the computing platform may receive a feedback message indicating performance of the executed action. At step 670, the computing platform may determine whether an additional intent was identified at step 610. If an additional intent was identified, the computing platform may return to step 615. If an additional intent was not identified, the computing platform may proceed to step 675. At step 675, the computing platform may generate and send one or more commands directing the client device to display a feedback interface indicating information from one or more feedback messages.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising: at least one processor; a communication interface communicatively coupled to the at least one processor; and memory storing computer-readable instructions that, when executed by the at least one processor, cause the computing platform to:
   receive a first message;
   apply one or more natural language processing algorithms to the first message to identify a first intent associated with the first message and a first confidence score associated with the identified first intent, wherein the computing platform includes a machine learning engine having instructions that direct the computing platform to set, define, and iteratively refine one or more optimization rules for a classification model;
   determine, using the classification model, that the first confidence score exceeds a predetermined intent identification threshold;
   identify, in response to determining that the first confidence score exceeds the predetermined intent identification threshold, a first destination device associated with the identified intent and a structured format associated with the first destination device;
   generate a second message, wherein the second message comprises the identified intent and conforms to the structured format associated with the first destination device; and
   send, to the first destination device, the second message, wherein sending the second message to the first destination device causes the first destination device to perform an action associated with the identified first intent.

2. The computing platform of claim 1, wherein applying the one or more natural language processing algorithms to the first message causes the computing platform to identify a second intent associated with the first message and a second confidence score associated with the second identified intent.

3. The computing platform of claim 2, wherein the memory stores additional computer-readable instructions that, when executed by the at least one processor, further cause the computing platform to:
   determine that the second confidence score does not exceed the predetermined intent identification threshold; and
   send, in response to determining that the second confidence score does not exceed the predetermined intent identification threshold, one or more commands directing an enterprise user device to display a prompt for manual review of the second identified intent.

4. The computing platform of claim 3, wherein the memory stores additional computer-readable instructions that, when executed by the at least one processor, further cause the computing platform to:
   receive, in response to the one or more commands directing the enterprise user device to display the prompt for manual review of the second identified intent, a third message indicating user input entered at the enterprise user device in response to the prompt for the manual review of the second identified intent; and
   tune, based on the user input, one or more machine learning models used to determine the second intent.

5. The computing platform of claim 4, wherein the memory stores additional computer-readable instructions that, when executed by the at least one processor, further cause the computing platform to:
   identify, based on the user input entered at the enterprise user device in response to the prompt for the manual review of the second identified intent, a second destination device associated with the second identified intent and a structured format associated with the second destination device;
   generate a fourth message, wherein the fourth message comprises the second identified intent and conforms to the structured format associated with the second destination device; and
   send, to the second destination device, the second message, wherein sending the second message to the second destination device causes the second destination device to perform an action associated with the second identified intent.

6. The computing platform of claim 5, wherein the memory stores additional computer-readable instructions that, when executed by the at least one processor, further cause the computing platform to:
receive:
a first feedback message indicating the first destination device performed the action associated with the first identified intent, and
a second feedback message indicating the second destination device performed the action associated with the second identified intent;
generate, based on the first feedback message and the second feedback message, a third feedback message indicating that the action associated with the first identified intent and the action associated with the second identified intent have been completed; and
send, to a sender device associated with the first message, the third feedback message.

7. The computing platform of claim 6, wherein the memory stores additional computer-readable instructions that, when executed by the at least one processor, further cause the computing platform to:
identify a language of the first message, wherein generating the third feedback message comprises generating the third feedback message in the language of the first message.

8. The computing platform of claim 1, wherein the memory stores additional computer-readable instructions that, when executed by the at least one processor, further cause the computing platform to:
determine, prior to sending the second message, that the first message does not contain information needed by the first destination device to perform the action associated with the first intent;
send, to a sender device that sent the first message, one or more commands directing the sender device to display a prompt for the information needed by the first destination device to perform the action associated with the first intent; and
receive, from the sender device and in response to the one or more commands directing the sender device to display a prompt for the information needed by the first destination device to perform the action associated with the first intent, the information needed by the first destination device to perform the action associated with the first intent.

9. The computing platform of claim 8, wherein generating the second message comprises generating, using the information needed by the first destination device to perform the action associated with the first intent, the second message.

10. The computing platform of claim 1, wherein the memory stores additional computer-readable instructions that, when executed by the at least one processor, further cause the computing platform to:
determine, prior to sending the second message, that the first message does not contain information needed by the first destination device to perform the action associated with the first intent;
identify an enterprise data source hosting the information needed by the first destination device to perform the action associated with the first intent;
send, to the enterprise data source hosting the information needed by the first destination device to perform the action associated with the first intent, one or more commands directing the enterprise data source to provide the information needed by the first destination device to perform the action associated with the first intent; and
receive, from the enterprise data source and in response to the one or more commands directing the enterprise data source to provide the information needed by the first destination device to perform the action associated with the first intent, the information needed by the first destination device to perform the action associated with the first intent, wherein generating the second message comprises generating, based on the information needed by the first destination device to perform the action associated with the first intent, the second message.

11. The computing platform of claim 10, wherein identifying the first destination device associated with the identified intent and the structured format associated with the first destination device comprises accessing a dynamic stored table, wherein the dynamic stored table contains:
correlations between one or more intents and one or more destination devices;
correlations between the one or more destination devices and one or more structured formats; and
correlations between the one or more structured formats and one or more mandatory data fields, wherein determining prior to sending the second message, that the first message does not contain the information needed by the first destination device to perform the action associated with the first intent comprises comparing content from the first message with one or more mandatory data fields associated with one or more structured formats associated with one or more destination devices associated with the first intent.

12. A method comprising:
at a computing platform comprising at least one processor, a communication interface, and memory:
receiving a first message;
applying one or more natural language processing algorithms to the first message to identify a first intent associated with the first message and a first confidence score associated with the identified first intent, wherein the computing platform includes a machine learning engine having instructions that direct the computing platform to set, define, and iteratively refine one or more optimization rules for a classification model;
determining, using the classification model, that the first confidence score exceeds a predetermined intent identification threshold;
identifying, in response to determining that the first confidence score exceeds the predetermined intent identification threshold, a first destination device associated with the identified intent and a structured format associated with the first destination device;
generating a second message, wherein the second message comprises the identified intent and conforms to the structured format associated with the first destination device; and
sending, to the first destination device, the second message, wherein sending the second message to the first destination device causes the first destination device to perform an action associated with the identified first intent.

13. The method of claim 12, wherein applying the one or more natural language processing algorithms to the first message causes the computing platform to identify a second intent associated with the first message and a second confidence score associated with the second identified intent.

14. The method of claim 13, further comprising:
determining that the second confidence score does not exceed the predetermined intent identification threshold;
sending, in response to determining that the second confidence score does not exceed the predetermined intent identification threshold, one or more commands directing an enterprise user device to display a prompt for manual review of the second identified intent;
receiving, in response to the one or more commands directing the enterprise user device to display the prompt for manual review of the second identified intent, a third message indicating user input entered at the enterprise user device in response to the prompt for the manual review of the second identified intent; and
tuning, based on the user input, one or more machine learning models used to determine the second intent.

15. The method of claim 14, further comprising:
identifying, based on the user input entered at the enterprise user device in response to the prompt for the manual review of the second identified intent, a second destination device associated with the second identified intent and a structured format associated with the second destination device;
generating a fourth message, wherein the fourth message comprises the second identified intent and conforms to the structured format associated with the second destination device; and
sending, to the second destination device, the second message, wherein sending the second message to the second destination device causes the second destination device to perform an action associated with the second identified intent.

16. The method of claim 15, further comprising:
receiving:
  a first feedback message indicating the first destination device performed the action associated with the first identified intent, and
  a second feedback message indicating the second destination device performed the action associated with the second identified intent;
generating, based on the first feedback message and the second feedback message, a third feedback message indicating that the action associated with the first identified intent and the action associated with the second identified intent have been completed; and
sending, to a sender device associated with the first message, the third feedback message.

17. The method of claim 16, further comprising:
identifying a language of the first message, wherein generating the third feedback message comprises generating the third feedback message in the language of the first message.

18. The method of claim 12, further comprising:
determining, prior to sending the second message, that the first message does not contain information needed by the first destination device to perform the action associated with the first intent;
sending, to a sender device that sent the first message, one or more commands directing the sender device to display a prompt for the information needed by the first destination device to perform the action associated with the first intent; and
receiving, from the sender device and in response to the one or more commands directing the sender device to display a prompt for the information needed by the first destination device to perform the action associated with the first intent, the information needed by the first destination device to perform the action associated with the first intent, wherein generating the second message comprises generating, using the information needed by the first destination device to perform the action associated with the first intent, the second message.

19. The method of claim 12, further comprising:
determining, prior to sending the second message, that the first message does not contain information needed by the first destination device to perform the action associated with the first intent;
identifying an enterprise data source hosting the information needed by the first destination device to perform the action associated with the first intent;
sending, to the enterprise data source hosting the information needed by the first destination device to perform the action associated with the first intent, one or more commands directing the enterprise data source to provide the information needed by the first destination device to perform the action associated with the first intent;
receiving, from the enterprise data source and in response to the one or more commands directing the enterprise data source to provide the information needed by the first destination device to perform the action associated with the first intent, the information needed by the first destination device to perform the action associated with the first intent, wherein:
  generating the second message comprises generating, based on the information needed by the first destination device to perform the action associated with the first intent, the second message; and
  identifying the first destination device associated with the identified intent and the structured format associated with the first destination device comprises accessing a dynamic stored table, wherein the dynamic stored table contains:
    correlations between one or more intents and one or more destination devices;
    correlations between the one or more destination devices and one or more structured formats; and
    correlations between the one or more structured formats and one or more mandatory data fields, wherein determining prior to sending the second message, that the first message does not contain the information needed by the first destination device to perform the action associated with the first intent comprises comparing content from the first message with one or more mandatory data fields associated with one or more structured formats associated with one or more destination devices associated with the first intent.

20. One or more non-transitory computer-readable media storing instructions that, when executed by a computing platform comprising at least one processor, a communication interface, and memory, cause the computing platform to:
receive a first message;
apply one or more natural language processing algorithms to the first message to identify a first intent associated with the first message and a first confidence score associated with the identified first intent, wherein the computing platform includes a machine learning engine having instructions that direct the computing platform to set, define, and iteratively refine one or more optimization rules for a classification model;

determine, using the classification model, that the first confidence score exceeds a predetermined intent identification threshold;

identify, in response to determining that the first confidence score exceeds the predetermined intent identification threshold, a first destination device associated with the identified intent and a structured format associated with the first destination device;

generate a second message, wherein the second message comprises the identified intent and conforms to the structured format associated with the first destination device; and send, to the first destination device, the second message, wherein sending the second message to the first destination device causes the first destination device to perform an action associated with the identified first intent.

* * * * *

UNITED STATES PATENT AND TRADEMARK OFFICE
CERTIFICATE OF CORRECTION

| | |
|---|---|
| PATENT NO. | : 11,361,164 B2 |
| APPLICATION NO. | : 16/789573 |
| DATED | : June 14, 2022 |
| INVENTOR(S) | : Robert Julian Oddy |

It is certified that error appears in the above-identified patent and that said Letters Patent is hereby corrected as shown below:

In the Claims

Column 21, Line 58:
In Claim 1, after "comprising:", insert --¶--

Column 21, Lines 58-59:
In Claim 1, after "processor;", insert --¶--

Column 21, Line 60:
In Claim 1, after "and", insert --¶--

Signed and Sealed this
Twenty-eighth Day of March, 2023

Katherine Kelly Vidal
*Director of the United States Patent and Trademark Office*